United States Patent [19]
Conklin
[11] 4,372,356
[45] Feb. 8, 1983

[54] SIZING TOOL FOR DOWEL ENDS

[76] Inventor: James O. Conklin, 502 Tribune Bldg., Terre Haute, Ind. 47807

[21] Appl. No.: 245,935
[22] Filed: Mar. 20, 1981
[51] Int. Cl.³ .............. B23B 27/00
[52] U.S. Cl. .............. 142/56
[58] Field of Search .............. 142/56, 55, 49, 48; 82/35, 36 R

[56] References Cited

U.S. PATENT DOCUMENTS

| | | | |
|---|---|---|---|
| 232,634 | 9/1880 | Durgin | 142/56 |
| 738,422 | 9/1903 | Duffy . | |
| 911,729 | 2/1909 | Jones . | |
| 1,262,678 | 4/1918 | Lapoint . | |
| 1,506,285 | 8/1924 | Seablom . | |
| 1,510,285 | 9/1924 | Lustenberger . | |
| 2,848,020 | 8/1958 | Zemrowski | 142/56 |
| 2,913,019 | 11/1959 | Sprague | 142/49 |
| 3,229,731 | 1/1966 | Hilton | 142/56 |
| 3,826,008 | 7/1974 | Nishina | 33/147 F |

FOREIGN PATENT DOCUMENTS

| | | | |
|---|---|---|---|
| 40669 | 9/1907 | Switzerland | 142/56 |

*Primary Examiner*—Leonidas Vlachos
*Attorney, Agent, or Firm*—Woodard, Weikart, Emhardt & Naughton

[57] ABSTRACT

Disclosed is a hand-held tool for accurately forming the spindle diameter of a wooden workpiece turning on a lathe. The tool has an extending bar, adapted to be positioned under the turning workpiece and a plate to which the bar is clamped, the spacing between the bar and plate being adjustable. One portion of the plate carries an elongated handle, the opposed portion of the plate having a sharpened transverse edge which is fed into the turning workpiece as the bar underlies the lathe mounted workpiece. The dowel end of the workpiece is thus reduced to the desired diameter, equal to the spacing between the bar and the sharpened edge of the plate.

4 Claims, 2 Drawing Figures

SIZING TOOL FOR DOWEL ENDS

BACKGROUND OF THE INVENTION

In handcraft manufacture of furniture, or the like, a difficulty often exists in rapidly and accurately sizing the dowel end (the end portion to be accommodated in a hole in an abutting piece) of a workpiece or spindle turning on a lathe. The workpiece is usually decoratively formed on the lathe and a dowel end which is under size in diameter, for example, can cause assembly problems in fitting too loosely in standardized dowel holes.

Further, the conventional method for sizing a spindle or workpiece on a lathe requires the use of outside calipers in one hand of the operator and a parting tool in the other as the lathe is addressed, a procedure having inherent safety risks and tending to obstruct vision of the work.

The tool of the present invention provides for accurately sizing, as to diameter, workpiece or spindle dowel ends as the piece is turning on a lathe. It provides a cutting edge which is adjustably spaced from a reference bar adapted to extend in contiguous, underlying relation to the workpiece turning on a lathe. The tool may be rested on the lathe's tool rest and manually fed into the workpiece to reduce its dowel end to the predetermined, adjusted diameter. In using the tool, the operator's hands may be well back from the turning lathe and vision of the work is unobstructed.

DESCRIPTION OF THE PREFERRED EMBODIMENT

Figure 1:
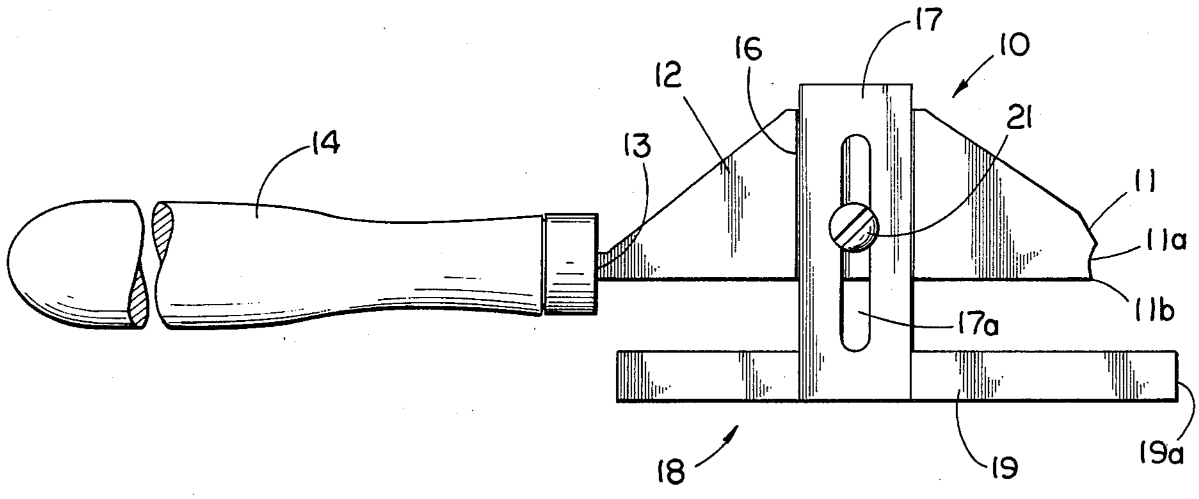
FIG. 1 is a side view of the assembled tool of the present invention.

Referring initially to FIG. 1, the hand-held tool may be seen to include a generally triangular plate 10, which may have a thickness of approximately one-fourth inch and, having truncated apices 11, 12 and 13. A handle 14 is rigidly secured to the plate adjacent apex 13. The apex portion 11 is hollow ground to provide a slight concavity 11*a* and the sharpened transverse edge 11*b*.

One face of the plate is provided with a relatively wide, rectilinear groove 16 extending from apex 12 to the opposed base margin of the plate. The groove receives the leg portion 17 of an inverted, T-shaped bar 18 having a base portion 19, the leading end 19*a* of which extends beyond the sharpened edge 11*b* of plate 10. The base portion 19 has a thickness identical to that of plate 10, while the leg 17 has a thickness equal to that of the depth of groove 16 (approximately one-eighth inch) so that leg 17, slidable in groove 16, is flush with the adjacent side surface of the plate 10 and base portion 19 is in the same plane as plate 10.

The leg 17 is provided with a longitudinal slot 17*a* and an adjusting screw 21 extends freely through the slot and is threaded into the underlying surface of plate 10. The screw thus serves as a clamp for fixing the position of leg 17 in groove 16 and thus the vertical spacing between bar portion 19 and the sharpened edge 11*b* of plate 10.

In operation, the diameter of the hole or aperture into which the dowel end of the finished workpiece is to be fitted may be measured by inside calipers and this measurement, by use of clamping screw 21, can be transferred to the tool of the present invention, making the spacing between cutting edge 11*b* and the upper margin of bar portion 19 equal to the calipered diameter.

Figure 2:
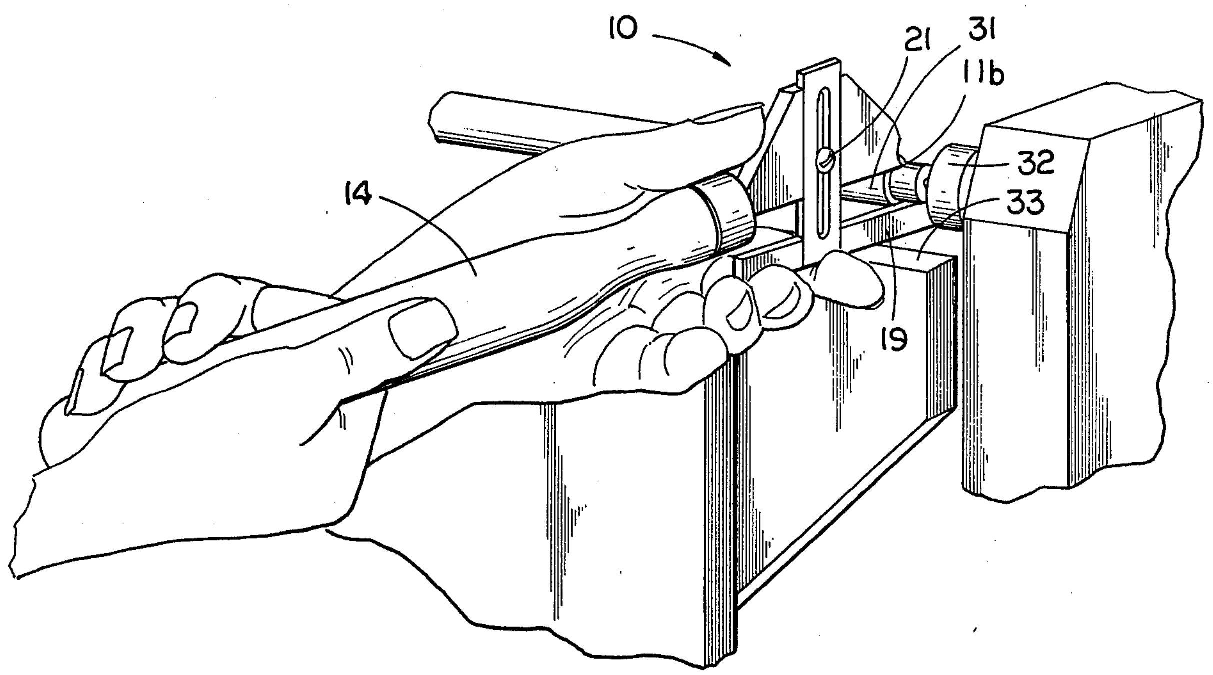
FIG. 2 is a perspective view of the tool in use.

As may be seen in FIG. 2, with a workpiece 31 (the diameter of its dowel end having previously been brought to an oversize dimension) turning on a lathe spindle 32 and with the lathe's tool rest 33 lowered to a convenient height, the tool, in a substantially level attitude, is hand-held so that the bar portion 10 is positioned under the workpiece. The cutting edge 11*b* is then pushed gently into the work. When the tool slides over the work, the dowel end of the workpiece will have been reduced to a diameter equal to the predetermined vertical spacing between bar portion 19 and edge 11*b*. The tool can then be withdrawn and the operation repeated as required to obtain the desired axial length of the reduced dowel end.

While the invention has been illustrated and described in detail in the drawings and foregoing description, this is to be considered as illustrative and not restrictive in character, it being understood that only the preferred embodiment has been shown and described and that all changes and modifications that come within the spirit of the invention are intended to be protected.

I claim:

1. A hand-held tool for accurately sizing as to diameter a workpiece turning on a lathe, said tool comprising a generally triangular plate having truncated apices, a handle rigidly secured to one apex of the plate, a sharpened transverse edge formed at the truncated apex opposite said one apex, one face of said plate having a rectilinear groove extending from the third apex of said plate to the opposed base margin of the plate, an inverted generally T-shaped bar having its base-portion positioned in the plane of said plate and extending beyond said sharpened transverse edge of the plate, the leg portion of said bar being adjustably accommodated within said groove to permit adjustable spacing between said bar base portion and said sharpened plate edge, whereby said tool may be positioned so that said bar base portion may engage the underside of the turning workpiece and said sharpened edge of the plate may engage the turning workpiece reducing its diameter to that of the adjusted spacing between said bar base portion and said sharpened plate edge.

2. A hand-held tool as claimed in claim 1 in which the adjustable accommodation of said bar leg portion in said groove includes a longitudinal slot in said leg portion and an adjusting screw extending freely through the slot and threaded into said plate for clamping the leg portion to the plate.

3. A hand-held tool as claimed in claim 1 in which said plate and said base portion of said bar are of substantially the same thickness.

4. A hand-held tool as claimed in claim 3 in which the depth of said groove and the thickness of said leg portion is substantially flush with the adjacent surface of said plate.

* * * * *